United States Patent [19]

Suzuki et al.

[11] Patent Number: 5,613,015
[45] Date of Patent: Mar. 18, 1997

[54] IMAGE SIGNAL ANALYZING SYSTEM AND CODING SYSTEM

[75] Inventors: Kazuhiro Suzuki; Yutaka Koshi; Setsu Kunitake; Shunichi Kimura; Koh Kamizawa, all of Kanagawa, Japan

[73] Assignee: Fuji Xerox Co., Ltd., Tokyo, Japan

[21] Appl. No.: 456,607

[22] Filed: Jun. 1, 1995

Related U.S. Application Data

[63] Continuation of Ser. No. 149,746, Nov. 10, 1993, abandoned.

[30] Foreign Application Priority Data

Nov. 12, 1992 [JP] Japan .................................. 4-302628
Nov. 16, 1992 [JP] Japan .................................. 4-305455

[51] Int. Cl.$^6$ .................................................. G06K 9/34
[52] U.S. Cl. ........................ 382/173; 382/171; 382/176; 382/248; 382/251; 382/239
[58] Field of Search ............................... 382/232, 239, 382/248, 250, 251, 168, 170, 171, 173, 176, 192, 207, 216; 348/404, 405, 406; 358/430, 432, 433

[56] References Cited

U.S. PATENT DOCUMENTS

| 5,214,507 | 5/1993 | Aravind et al. | 382/56 |
| 5,263,100 | 11/1993 | Kim et al. | 382/250 |
| 5,282,255 | 1/1994 | Bovik et al. | 382/56 |
| 5,337,087 | 8/1994 | Mishima | 348/405 |

OTHER PUBLICATIONS

"Digital Compression and Coding of Continuous Tone Still Images, Part 1: Requirements and Guidelines", ISD 10918-1, CCITT Recomm. T.81., pp. 1–29 (Oct. 1991).

"Image Processing Handbook (9.3 Coding of Monochromatic Still Picture)" Morio Ogami, Shokodo Inc., pp. 220–221, 1987.

Gregory K. Wallace, "The JPEG Still Picture Compression Standard", IEEE Transactions on Consumer Electronics, vol. 38, No. 1, Feb. 1992, pp. xviii–xxxiv.

Primary Examiner—Leo Boudreau
Assistant Examiner—Phuoc Tran
Attorney, Agent, or Firm—Finnegan, Henderson, Farabow, Garrett & Dunner, L.L.P.

[57] ABSTRACT

An image signal analyzing system for analyzing a pattern of an image on the basis of the waveforms of the image signals. The system includes a block extracting section for sampling an image signal and dividing the sampled image signal into input pixel blocks each consisting of m×n pixels (m and n are positive integers), a mean value separating section for subtracting a mean value from each pixel in the pixel block, a first analyzing section for analyzing a feature quantity of the direction of the tone variation of a mean-value separated block obtained from the mean value separating section, a second analyzing section for analyzing a feature quantity of the direction of amplitude of the mean-value separated block, and a judging section for judging a feature of waveform of the input pixel block on the basis of the analysis results of the first analyzing section and the second analyzing section.

13 Claims, 12 Drawing Sheets

σ : BLOCK VARIANCE

FIG. 9(a) PHOTOGRAPH

| | | | | | | |
|---|---|---|---|---|---|---|
| 16 | 24 | 32 | 38 | 44 | 52 | 60 | 65 |
| 26 | 33 | 38 | 43 | 49 | 58 | 64 | 69 |
| 34 | 39 | 42 | 47 | 53 | 61 | 66 | 70 |
| 41 | 45 | 48 | 53 | 59 | 66 | 70 | 72 |
| 48 | 51 | 54 | 60 | 64 | 69 | 71 | 72 |
| 57 | 61 | 63 | 67 | 69 | 73 | 73 | 75 |
| 64 | 67 | 67 | 70 | 70 | 73 | 73 | 74 |
| 68 | 71 | 70 | 72 | 73 | 74 | 75 | 77 |

FIG. 9(b) VERTICAL

| | | | | | | | |
|---|---|---|---|---|---|---|---|
| 16 | 32 | 51 | 58 | 67 | 81 | 94 | 106 |
| 12 | 30 | 50 | 56 | 65 | 84 | 96 | 102 |
| 15 | 32 | 54 | 60 | 72 | 86 | 98 | 107 |
| 17 | 36 | 53 | 69 | 79 | 93 | 105 | 111 |
| 22 | 40 | 56 | 73 | 81 | 95 | 110 | 114 |
| 29 | 45 | 61 | 77 | 89 | 104 | 113 | 116 |
| 31 | 51 | 63 | 79 | 93 | 103 | 114 | 114 |
| 35 | 56 | 69 | 86 | 99 | 110 | 121 | 124 |

FIG. 9(c) HORIZONTAL

| | | | | | | | |
|---|---|---|---|---|---|---|---|
| 16 | 12 | 15 | 20 | 25 | 31 | 37 | 44 |
| 28 | 27 | 31 | 32 | 38 | 46 | 52 | 63 |
| 55 | 49 | 47 | 49 | 53 | 55 | 60 | 69 |
| 57 | 54 | 60 | 63 | 72 | 72 | 68 | 76 |
| 63 | 59 | 67 | 76 | 83 | 89 | 91 | 94 |
| 77 | 75 | 88 | 96 | 100 | 105 | 106 | 109 |
| 100 | 94 | 98 | 104 | 108 | 113 | 117 | 124 |
| 95 | 93 | 105 | 113 | 116 | 122 | 123 | 127 |

FIG. 9(d) OBLIQUE

| | | | | | | | |
|---|---|---|---|---|---|---|---|
| 16 | 18 | 31 | 45 | 59 | 74 | 88 | 104 |
| 18 | 20 | 27 | 39 | 54 | 69 | 83 | 99 |
| 30 | 27 | 31 | 40 | 52 | 69 | 87 | 103 |
| 43 | 38 | 40 | 44 | 51 | 62 | 82 | 100 |
| 56 | 52 | 52 | 52 | 55 | 65 | 77 | 94 |
| 69 | 64 | 65 | 62 | 64 | 70 | 80 | 90 |
| 83 | 77 | 79 | 78 | 77 | 82 | 87 | 94 |
| 106 | 97 | 99 | 99 | 94 | 91 | 97 | 99 |

FIG. 9(e) OTHERS

| | | | | | | | |
|---|---|---|---|---|---|---|---|
| 16 | 19 | 25 | 33 | 44 | 54 | 66 | 74 |
| 19 | 25 | 31 | 40 | 52 | 62 | 77 | 87 |
| 25 | 32 | 37 | 46 | 56 | 67 | 81 | 90 |
| 30 | 40 | 47 | 53 | 62 | 72 | 83 | 93 |
| 38 | 50 | 56 | 63 | 72 | 82 | 91 | 99 |
| 47 | 61 | 66 | 73 | 81 | 89 | 99 | 106 |
| 55 | 70 | 77 | 84 | 89 | 98 | 110 | 116 |
| 60 | 78 | 86 | 92 | 99 | 105 | 113 | 121 |

$$Q(u, v) = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

FIG. 14(a)

| | | | | | | | |
|---|---|---|---|---|---|---|---|
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |

FIG. 14(b)

| | | | | | | | |
|---|---|---|---|---|---|---|---|
| -184 | -547 | 0 | -57 | 0 | -17 | 0 | -4 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 15(a)

| | | | | | | | |
|---|---|---|---|---|---|---|---|
| 0 | 0 | 0 | 0 | 0 | 0 | 0 | 0 |
| 30 | 30 | 30 | 30 | 30 | 30 | 30 | 30 |
| 60 | 60 | 60 | 60 | 60 | 60 | 60 | 60 |
| 90 | 90 | 90 | 90 | 90 | 90 | 90 | 90 |
| 120 | 120 | 120 | 120 | 120 | 120 | 120 | 120 |
| 150 | 150 | 150 | 150 | 150 | 150 | 150 | 150 |
| 180 | 180 | 180 | 180 | 180 | 180 | 180 | 180 |
| 210 | 210 | 210 | 210 | 210 | 210 | 210 | 210 |

FIG. 15(b)

| | | | | | | | |
|---|---|---|---|---|---|---|---|
| -184 | 0 | 0 | 0 | 0 | 0 | 0 | 0 |
| -547 | 0 | 0 | 0 | 0 | 0 | 0 | 0 |
| 0 | 0 | 0 | 0 | 0 | 0 | 0 | 0 |
| -57 | 0 | 0 | 0 | 0 | 0 | 0 | 0 |
| 0 | 0 | 0 | 0 | 0 | 0 | 0 | 0 |
| -17 | 0 | 0 | 0 | 0 | 0 | 0 | 0 |
| 0 | 0 | 0 | 0 | 0 | 0 | 0 | 0 |
| -4 | 0 | 0 | 0 | 0 | 0 | 0 | 0 |

IMAGE SIGNAL ANALYZING SYSTEM AND CODING SYSTEM

This application is a continuation of application Ser. No. 08/149,746, filed Nov. 10, 1993, now abandoned.

BACKGROUND OF THE INVENTION

1. Field of the Invention

The present invention relates to an image signal analyzing system for analyzing a pattern of an image on the basis of the waveforms of the image signals. Further, the invention relates to an image signal coding system for coding an image signal by using the image signal analyzing system.

2. Discussion of the Related Art

One of the known image data signal coding systems is an image signal coding system based on the discrete cosine transform, as a kind of the orthogonal transform, which is employed in the JPEG system as the standard system for facsimile communication. For the JPEG system, reference is made to ISO-IEC/CD 10918-1, "Digital Compression and Coding of Continuous-Tone Still Images Part 1 Requirement and Guideline".

The two-dimensional discrete cosine transform of degree is given by the following equation (1), and the reverse transform is given by the equation (2).

$$F(u, v) = 1/4\, C(u)C(v) \sum_{i=0}^{7} \sum_{j=0}^{7} f(i, j) \cdot \cos\{(2i + 1)u\pi/16\} \cos\{(2j + 1)v\pi/16\} \quad (1)$$

$$f(i, j) = 1/4 \sum_{u=0}^{7} \sum_{v=0}^{7} C(u)C(v)F(u, v) \cdot \cos\{(2i + 1)u\pi/16\} \cos\{(2j + 1)v\pi/16\} \quad (2)$$

Here, $$C(w) = \begin{cases} 1/\sqrt{2} & w = 0 \\ 1 & w = 1, 2, \ldots, 7 \end{cases} \quad (3)$$

where f(i,j) represents each element of a pixel block and i and j indicate a position of the element. F(u,v) represents each element of the transform coefficients, and u and v indicate a position of the element.

In the image signals of so-called natural images, such as portrait and scenery, as known, adjacent pixels tend to have proximate pixel values, that is, a high correlation is present between the adjacent pixels. The signal of high correlation indicates that signal power distribution is deviated to specific frequency components on the frequency axis. By coding only the frequency components on which the signal power is concentrated, the amount of information can be reduced as a whole. When the natural image is discrete cosine transformed, most of the signal power concentrates on the low frequency region in the signal power distribution.

The arrangement of a conventional image signal coding system will be described with reference to FIG. 10.

In the figure, reference numeral 1 designates an input image signal; 3, an input pixel block signal extracted from the input image signal by a block extracting section 2; 101, a transform coefficient signal produced from an orthogonal transforming section 100 where the discrete cosine transformation expressed by the equation (1) is applied to the input pixel block signal 3; 103, a quantizing matrix signal derived from a quantizing matrix storing section 104 where quantizing matrix values are stored; 105, a quantizing coefficient signal produced from a quantizing section 102 where the transform coefficient signal 101 is quantized in accordance with the quantizing matrix 103; 107, a variable length coded signal produced from a variable length coding section 106 where the quantizing coefficient signal 105 is variable length coded; and 109, coded data signal provided from a multiplying section 108 where the variable length coded signal 107 is multiplied. As described above, reference numeral 2 designates the block extracting section for extracting the input pixel block signal 3 representative of pixel blocks as square areas of pixels; 100, the orthogonal transforming section for discrete cosine transforming the input pixel block signal 3; 104, the quantizing matrix storing section for storing quantizing matrix values; 102, the quantizing section for quantizing the transform coefficient signal 101 in accordance with the quantizing matrix signal 103; 106, the variable length coding section for variable length coding the quantized coefficient signal 105; and 108, the multiplexing section for multiplexing the variable length coded signal 107 into the coded data signal 109.

The operation of the conventional image signal coding system will be described with reference to FIG. 10.

The block extracting section 2 extracts the input pixel block signal 3 representative of pixel blocks as square areas of pixels, from the input image signal 1, as shown in FIG. 11. In the figure, each pixel area consists of 8×8 pixels. In the description to follow, this pixel area size will be used in the related sections.

Subsequently, the orthogonal transforming section 100 applies the discrete cosine transforming process expressed by the equation (1) to the input pixel block signal 3. As the result of the transforming process, the orthogonal transforming section 100 produces the transform coefficient signal 101 of the 8×8 matrix. The transform coefficient signal 101, when output, takes the form of a one-dimensional coefficient series formed by scanning the matrix in a zig-zag fashion as shown in FIG. 12.

In the quantizing section 102, the quantizing process is carried out using the transform coefficient signal 101 and the quantizing matrix signal 103 that is stored in the quantizing matrix storing section 104. This process is a rounding process defined by the following equations $$C(u,v)=(F(u,v)+(Q(u,v)/2))/Q(u,v) \quad (F(u,v) \geq 0) \quad (4)$$

$$C(u,v)=(F(u,v)-(Q(u,v)/2))/Q(u,v) \quad (F(u,v) < 0) \quad (5)$$

where F(u,v) and Q(u,v) are respectively the elements of the transform coefficients and the quantizing matrix. u and v are representative of a position of each element. An example of the quantizing matrix 103 is shown in FIG. 13. A value of each position is called a quantizing step value.

The element values represented by the quantizing matrix signal 103 are stored in the quantizing matrix storing section 104 in the order along the path of a zig-zag scan shown in FIG. 12. With this, the quantizing section 102 reads the quantizing step values corresponding to the positions of the transform coefficients 101, and the quantizing processes of the equations (4) and (5) are carried out successively in the zig-zag scan order.

In the conventional technique, the image quality and the coding efficiency are determined by the quantizing process. The information reduction in the coding operation is realized by a reduction of the bit accuracy of the transform coefficients. Usually, the power distribution of the transform coefficients is deviated. Therefore, the improvement of both the image quality and the coding efficiency is made in a manner that the bit accuracy of the coefficients having large signal power in the signal power distribution is high, while the bit accuracy of the coefficients having small signal power is low or coarse. In the matrix of FIG. 13, a large number of bits are assigned to the coefficients of low frequency components, while a small number of bits are assigned to the coefficients of high frequency components.

The JPEG system as referred to above does not have a means for analyzing the waveforms of the input image signals. Further, in the JPEG system, only one type of quantizing characteristic is applied for one image (one color component in the case of a color image). For this reason, this coding system is adaptable for only the limited contents of an original document and can insufficiently improve both the reproduced image quality and the coding efficiency.

To solve these problems, a method for determining the best assignment of bits in accordance with the characteristic of each image on the basis of a variance of the transform coefficients is described in "IMAGE PROCESSING HANDBOOK (9.3 Coding of Monochromatic Still Picture)", written by Morio Ogami, published by Shokodo Inc., 1987, p221. This method succeeds in improving both the image quality and the compression efficiency. The assignment of bits in this adaptive bit assigning method is mathematically expressed by $$b(u,v) = \theta + 1/2 \log_2 \sigma(u,v)^2 - 1/2 * 8 * 8 \sum_{u=0}^{7} \sum_{v=0}^{7} \log_2 \sigma(u,v)^2 \quad (6)$$

$$\theta = 1/8 * 8 \sum_{u=0}^{7} \sum_{v=0}^{7} b(u,v) \quad (7)$$

where b(u,v) represents the number of bits assigned to the transform coefficient F(u,v), and σ(u,v)² is representative of a variance of the transform coefficient F(u,v), and θ represents the average number of bits.

Using the number of assigned bits b (u,v) and a dynamic range L (u,v) of the transform coefficients, we have a quantizing step value Q (u,v)

$$Q(u,v) = \text{Int } [L(u,v)/2^b(u,v)] \quad (8)$$

where Int [] means "to make the number integer".

The variable length coding section 106 shown in FIG. 10 encodes the quantizing coefficient signal 105 into the assigned variable length coded signal 107 by the variable length coding method, e.g., the Huffman coding method.

The multiplexing section 108 multiplexes the variable length coded signal 107 into the coded data signal 109. At this point, the coding operation is completed.

Usually, an image read by a scanner, for example, possibly contains different image areas, such as character areas and photograph areas. When the transform coding system is applied to the image containing the different image areas, the power distribution of the transform coefficients greatly differs with the image areas.

As described above, the technique for determining the best assignment of bits in accordance with the image characteristic has been already described in the handbook of "IMAGE PROCESSING HANDBOOK". In this conventional technique, the best bit assignment is determined on the basis of the average characteristic of the whole image to be coded. In other words, the different characteristics of the image areas are not taken into consideration in the coding operation. Accordingly, the technique must apply the average bit assignment obtained for the whole image to the character area contained in the photographic image. The character area requires many bits because of its high frequency components generated at the edges. The distribution of the high frequency components varies with the direction of the edge. Therefore, the coding technique based on the average bit assignment cannot well handle these characteristic differences. This means that the deterioration of the character image quality is inevitable.

Figures 16A, 16B:
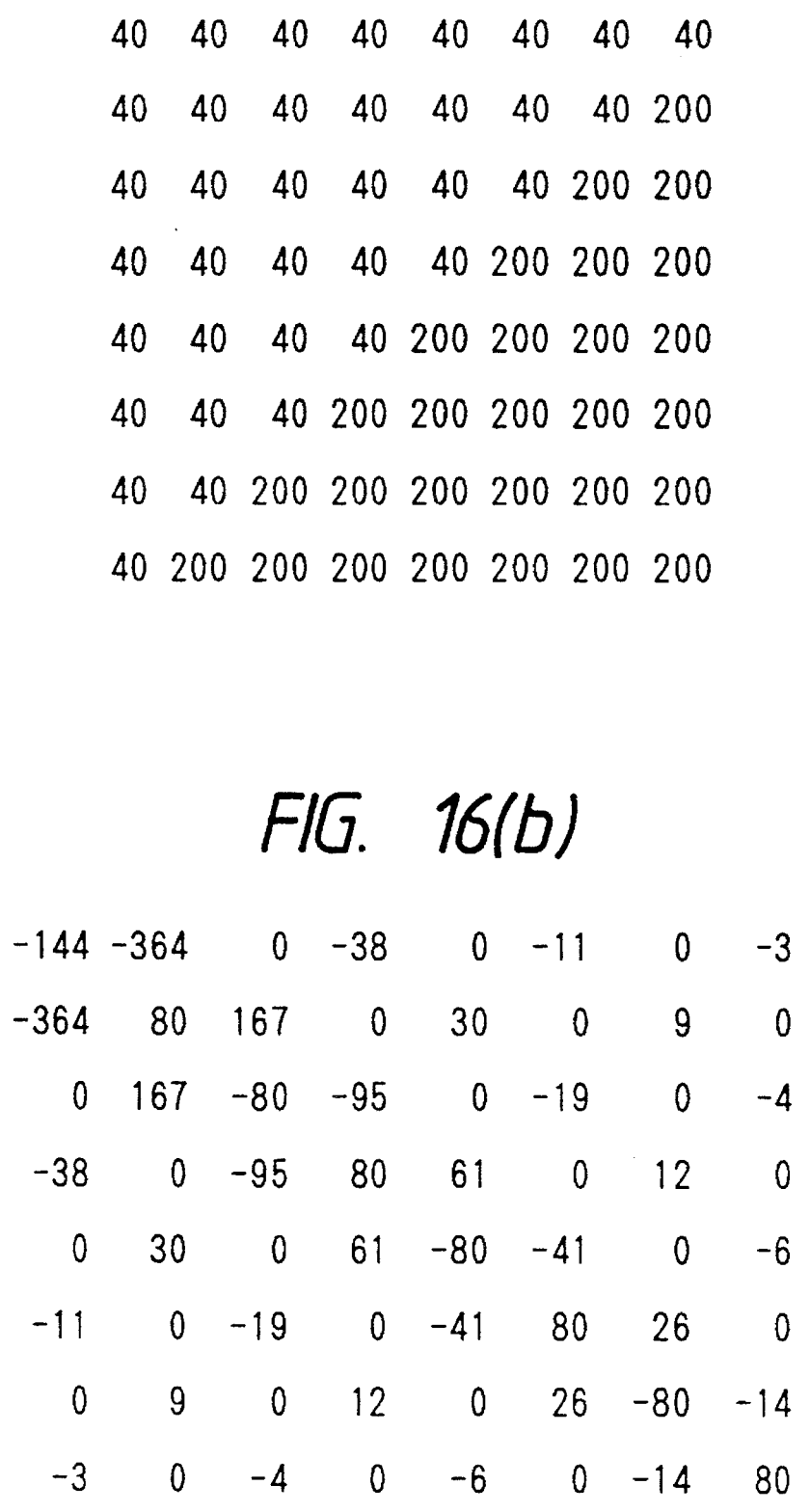

FIGS. 14(a) to 16(b) show some types of correspondence of a pixel distribution and a coefficient power distribution on some types of pixel blocks. In the pixel blocks of FIGS. 14(a) and 14(b), tone is varied in the horizontal direction. In the pixel blocks of FIGS. 15(a) and 15(b), tone is varied in the vertical direction. In the pixel blocks of FIGS. 16(a) and 16(b), tone is varied in the oblique direction. The pixel distributions are shown in FIGS. 14(a), 15(a) and 16(a), and the power distributions of transform coefficients are shown in FIGS. 14(b), 15(b) and 16(b). As seen from those figures, the coefficient power distribution varies depending on the direction of the tone variation of the input pixel blocks, and the amplitudes thereof. From those distributions of pixels and transform coefficients, it could be considered that the improvement of both the image quality and the coding efficiency would be ensured by an adaptive coding system for determining the quantizing characteristic of the transform coefficients on the basis of the results of analyzing the waveforms of the input pixel blocks.

SUMMARY OF THE INVENTION

Accordingly, an object of the present invention is to accurately analyze the waveforms of input pixel blocks.

In attaining the above object, the invention provides an image signal analyzing system including block extracting means for sampling an image signal and dividing the sampled image signal into input pixel blocks each consisting of m×n pixels (m and n are positive integers), mean value separating means for subtracting a mean value from each pixel in the pixel block, first analyzing means for analyzing a feature quantity of the direction of the tone variation of a mean-value separated block obtained from the mean value separating means, second analyzing means for analyzing a feature quantity of the direction of amplitude of the mean-value separated block, and judging means for judging a feature of waveform of the input pixel block on the basis of the analysis results of the first analyzing means and the second analyzing means.

Another object of the present invention is to realize the adaptive coding system capable of coding input image signals at high coding efficiency and with less deterioration of image quality.

In attaining the above object, the invention provides an image signal coding system including block extracting means for dividing an image signal into input pixel blocks each consisting of m×n pixels (m and n are positive integers), orthogonal transforming means for orthgonally transforming the input pixel blocks to produce transform coefficients, quantizing characteristic storing means for storing quantizing characteristics, quantizing means for quantizing the transform coefficients by the quantizing characteristics that are stored in the quantizing characteristic storing means to produce quantizing coefficients, coding means for variable-length coding the quantizing coefficients, multiplexing means for multiplexing the results of the variable-length coding to produce coded data, and waveform analyzing means for analyzing the waveform of the input pixel block, the quantizing characteristic being selected in accordance with the results of the waveform analysis.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIGS. 9(a) to 9(e) are diagrams showing five types of quantizing matrices designed for the photograph area and four types of divided character areas;

FIGS. 14(a) and 14(b) are diagrams showing the correspondence of a pixel distribution and a coefficient power distribution on a pixel block in which tone is varied in the horizontal direction;

FIGS. 15(a) and 15(b) are diagrams showing the correspondence of a pixel distribution and a coefficient power distribution on another type of pixel block in which tone is varied in the vertical direction; and FIGS. 16(a) and 16(b) are diagrams showing the correspondence of a pixel distribution and a coefficient power distribution on still another type of a pixel block in which tone is varied in the oblique direction.

DETAILED DESCRIPTION OF THE PREFERRED EMBODIMENT

Figure 1:
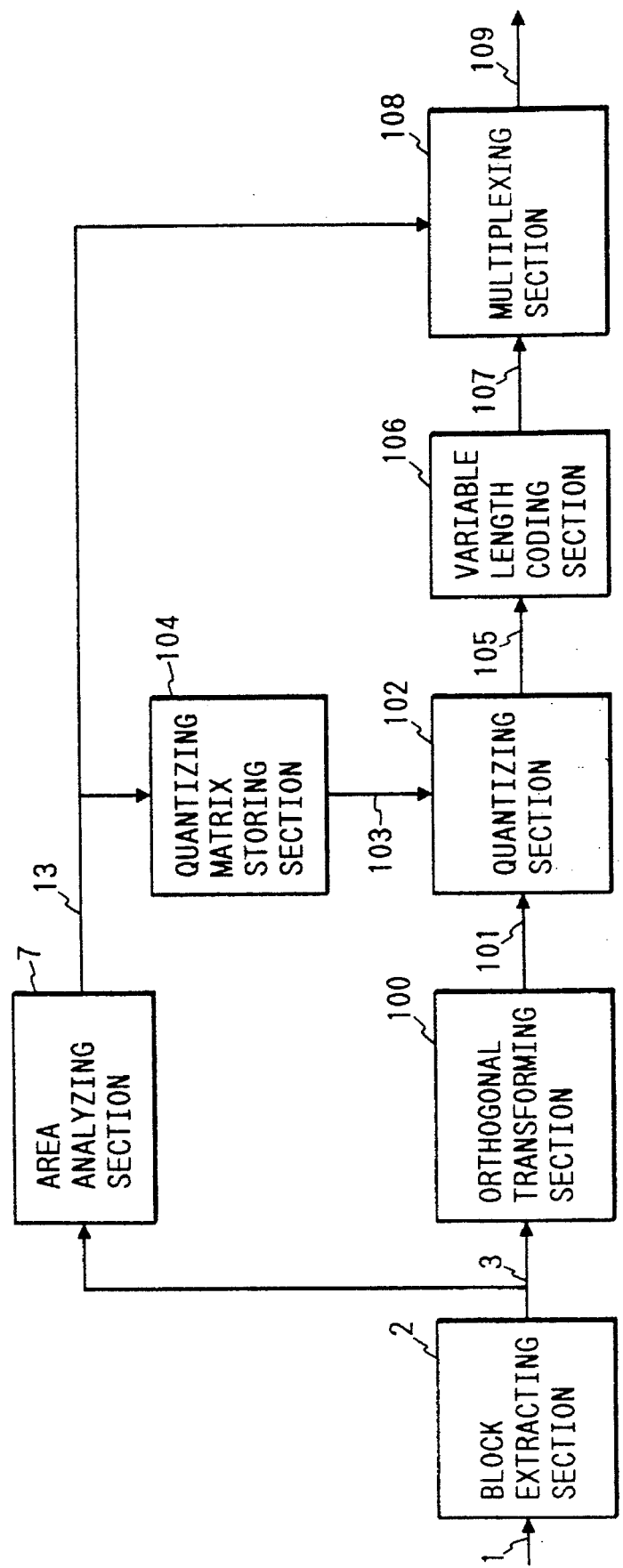
FIG. 1 is a block diagram showing the arrangement of an image signal coding system according to an embodiment of the invention.
Figure 10:
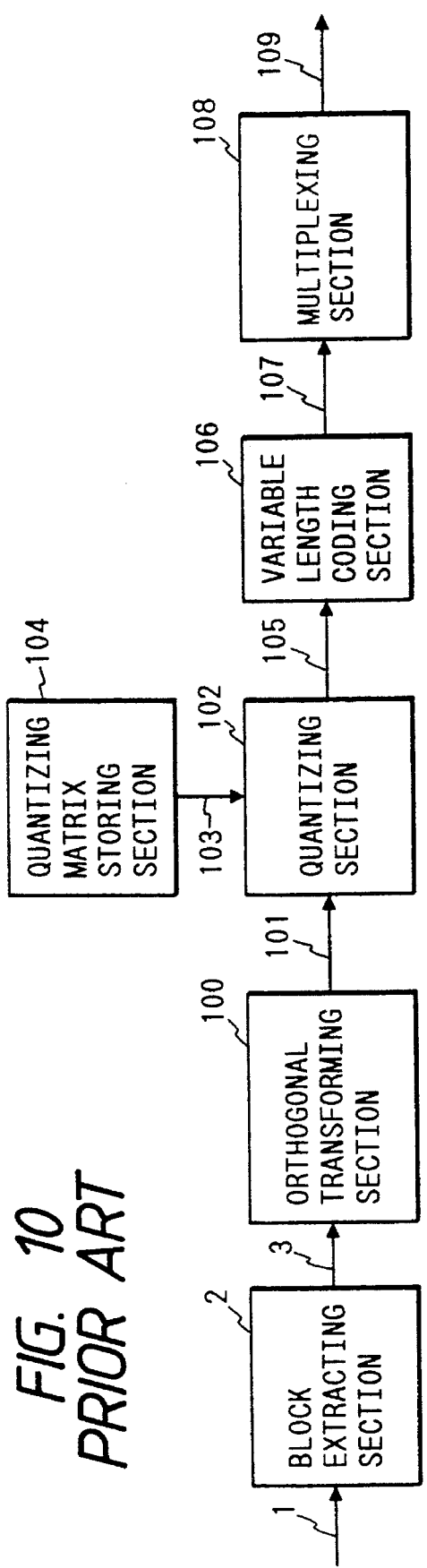
FIG. 10 is a block diagram showing the arrangement of a conventional image signal coding system.
Figure 11:
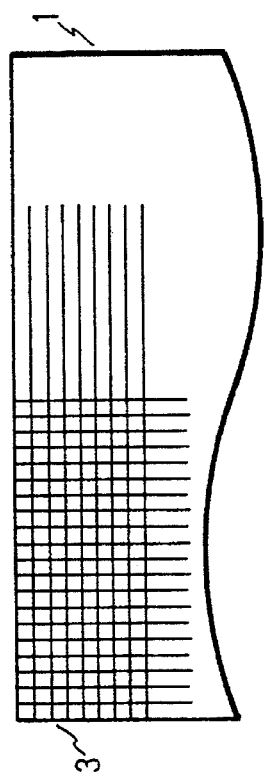
FIG. 11 is a diagram for explaining the way of extracting pixel blocks.

FIG. 1 is a block diagram showing the arrangement of an image signal coding system according to an embodiment of the invention. In the figure, like reference numerals are used for designating like or equivalent sections in FIG. 10 depicting the arrangement of the conventional image signal coding system.

In the figure, reference numeral 1 designates an input image signal; 3, an input pixel block signal extracted from the input image signal by a block extracting section 2; 13, an area data signal representing the result of analyzing the input pixel block signal 3 by an area analyzing section 7; 101, a transform coefficient signal produced from an orthogonal transforming section 100 where the discrete cosine transformation expressed by the equation (1) is applied to the input pixel block signal 3; 103, a quantizing matrix signal selected from among a set of quantizing matrix element values that are stored in a quantizing matrix storing section 104, by the area data signal 13; 105, a quantizing coefficient signal produced from a quantizing section 102 where the transformed coefficient signal 101 is quantized in accordance with the quantizing matrix signal 103; 107, a variable length coded signal 107 produced from a variable length coding section 106 where the quantized coefficient signal 105 is variable length coded; and 109, coded data signal produced from a multiplexing section 108 where the variable length coded signal 107 is multiplexed. As described above, reference numeral 2 designates the block extracting section for extracting the input pixel block signals 3 representative of pixel blocks as square areas of pixels; 7, area analyzing section for analyzing the waveforms and gains of the input pixel block signal 3 and producing the results of the analysis in the form of the area data signal 13; 100, the orthogonal transforming section for discrete cosine transforming the input pixel block signal 3; 104, the quantizing matrix storing section for storing quantizing matrix values and producing the quantizing matrix signal 103 that is selected in accordance with the area data signal 13; 102, the quantizing section for quantizing the transform coefficient signal 101 in accordance with the quantizing matrix signal 103; 106, the variable length coding section for variable length coding the quantized coefficient signal 105; and 108, the multiplexing section for multiplexing the variable length coded signal 107 into the coded data signal 109.

Figure 2:
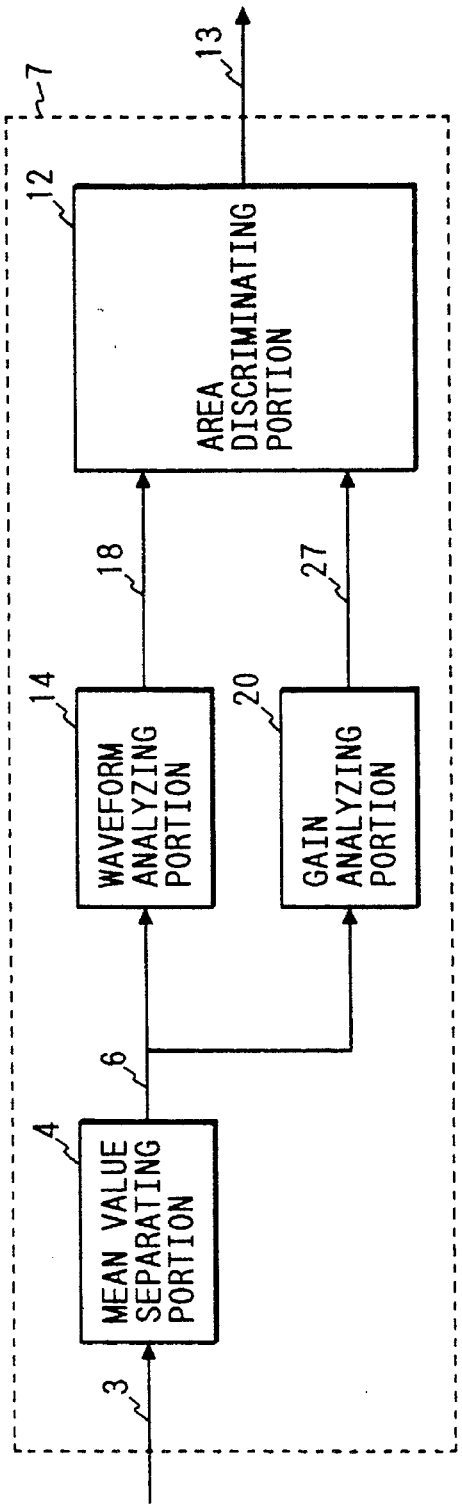
FIG. 2 is a block diagram showing an area analyzing section used in the image signal coding system of FIG. 1.

FIG. 2 is a block diagram showing the area analyzing section 7 used in the image signal coding system of FIG. 1.

In the figure, reference numeral 3 designates an input pixel block signal consisting of m×n pixels (m and n indicate integers) that is extracted by the block extracting section 2; numeral 6, a mean-value separated block signal representative of the result of subtracting a mean value of the input pixel block signal 3 from each pixel by a mean value separating portion 4; 18, a waveform data signal representative of the results of analyzing the waveform of the mean-value separated block 6 by a waveform analyzing portion 14; 27, a gain data signal indicating the results of analyzing the gain of the mean-value separated block 6 by a gain analyzing portion 20; and 13, an area data signal indicative of the result of discriminating an image area on the basis of the waveform data signal 18 and the gain data signal 27 by an area discriminating portion 12. As described above, the mean value separating portion 4 calculates a mean value of the input pixel block signal 3, and subtracts the mean value from each pixel to produce the mean-value separated block signal 6. The waveform analyzing portion 14 analyzes the waveform of the mean-value separated block signal 6 to produce the waveform data signal 18. The gain analyzing portion 20 analyzes the gain data of the mean-value separated block signal 6 to produce the gain data signal 27. The area discriminating portion 12 discriminates the image area of the input pixel block 3 on the basis of the waveform data signal 18 and the gain data signal 27 to produce the area data signal 13.

Figure 3:
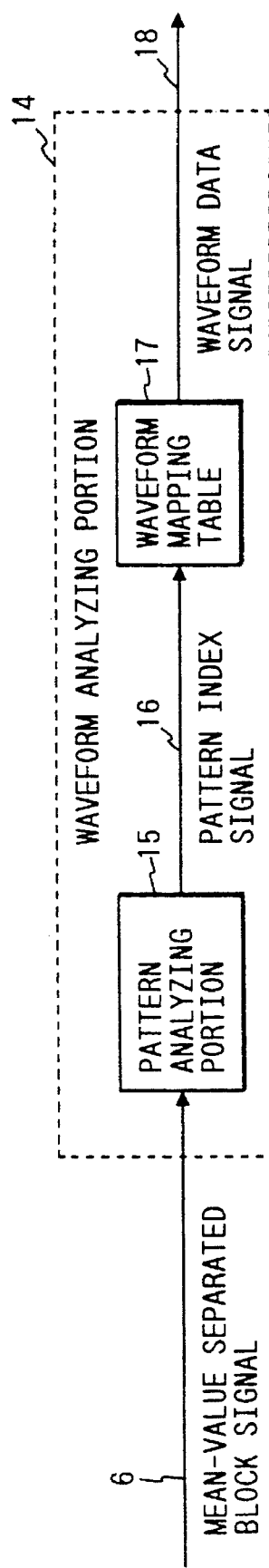
FIG. 3 is a block diagram showing a waveform analyzing portion in the area analyzing section shown in FIG. 2.

FIG. 3 is a block diagram showing the waveform analyzing portion 14 in the area analyzing section shown in FIG. 2. In the figure, a pattern analyzing portion 15 selects a pattern index signal 16 indicative of a representative vector. A waveform mapping table 17 produces a waveform data signal 18. The pattern analyzing portion 15 carries out a pattern matching of sets of representative vectors having representative waveform data and the mean-value separated block 6 consisting of m×n pixels, and selects the set of representative vectors having the waveform data, of which the pattern most resembles that of the block. The waveform mapping table 17 produces the waveform data signal 18 in accordance with the pattern index signal 16.

Figure 4:
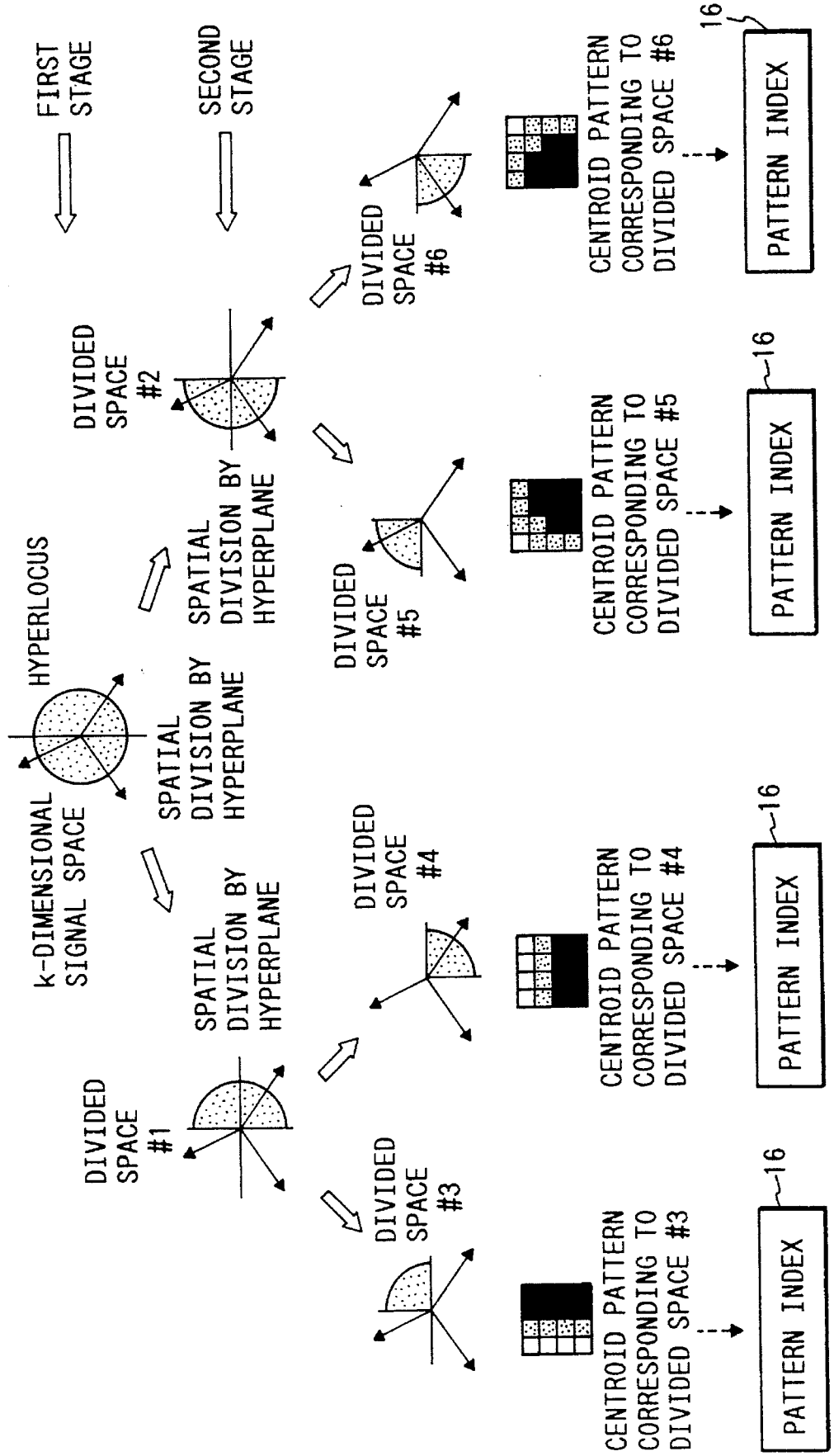
FIG. 4 is an explanatory diagram for explaining the waveform data analysis.

The pattern analyzing portion 15 shown in FIG. 3, for example, analyzes the waveform of the block by carrying out a pattern matching of sets of representative vectors having representative waveform data that are previously prepared, with a block to be analyzed (referred to as an analyzed block), i.e., the mean-value separated block 6, as shown in FIG. 4. The waveform analysis provides the pattern index signal 16 for the directions of the tone variation of the analyzed block.

The pattern matching is defined by the following equation $$d(x, y_p) = \min \{d(x, y_i)\}, \text{ (for every } i)$$

(i=1, 2, ..., k)
provided that x is the analyzed block of m×n pixels and is expressed by $$x = \{x_i | i = 1, 2, \ldots, m \times n\}$$

and y is the representative vector set consisting of k representative vectors and is expressed by $$y = \{y_i | i = 1, 2, \ldots, k\}.$$

In the above equation defining the pattern matching, $d(x, y_i)$ represents a measure of distortion of x and $y_i$, and it is defined by the square distortion, for example. p represents an index of the representative vector, i.e., the pattern index signal 16. It indicates that the representative vector $y_p$ represented by the index p is selected as the representative vector having the waveform data closest to the analyzed block.

Hereinafter, the operation of the waveform analyzing portion for waveform analysis will be described.

The sets of the representative vectors are designed by applying the major component analysis to the tone variations having the horizontal, vertical, and other directions. In order to reduce the memory capacity of the memory for storing the representative vector sets, the pattern matching is carried out using subblocks of the block 3. For example, if the input pixel block 3 has the size of 8×8, the block is divided into four subblocks each having the size of 4×4. The four pattern indices obtained every subblock indicate the features of the two-dimensional waveforms of the 4×4 pixel blocks of the 8×8 input pixel block. These four indices are input to the waveform mapping table 17 where the indices specify the data indicating the waveform of the whole block of 8×8 pixels. The specified data is output in the form of the waveform data signal 18. In this case, a variation (a degree of complexity) of the directions of the waveforms of the four subblocks are taken into consideration. For example, when the directions of the waveforms of the four subblocks are coincident with one another, the complexity degree is low. When the directions of them are different from one another, the complexity degree is high.

Figure 5:
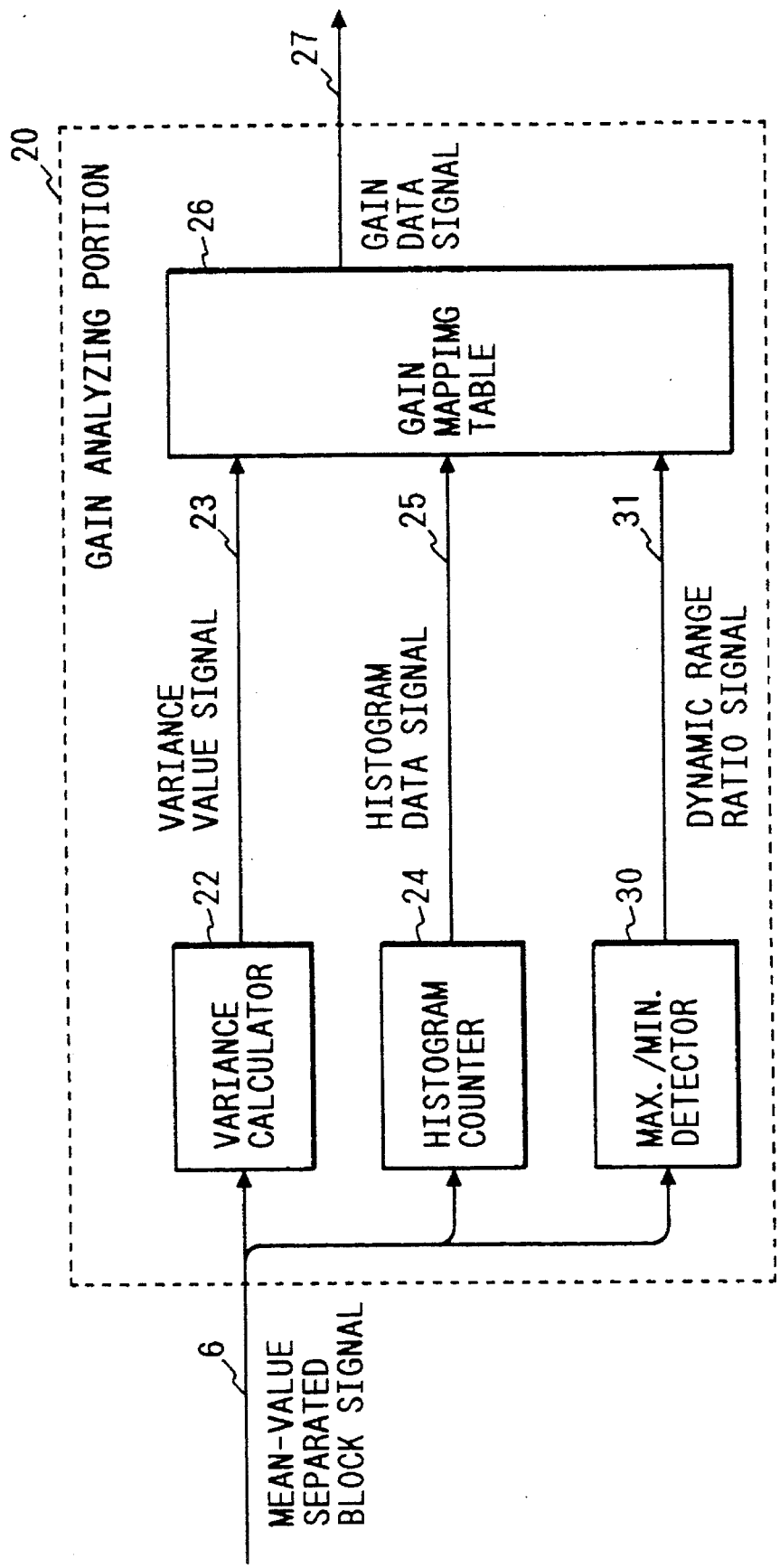
FIG. 5 is a block diagram showing a gain analyzing portion used in the area analyzing section of FIG. 2.

FIG. 5 is a block diagram showing the gain analyzing section 20 used in the area analyzing portion of FIG. 2. In the figure, reference numeral 23 designates a variance value signal output from a variance calculator 22; 25, a histogram data signal output from a histogram counter 24; 27, a gain data signal; and 31, a dynamic range ratio signal indicative of a ratio of the maximum value and the minimum value within the mean-value separated block 6. As described above, reference numeral 22 designates the variance calculator for calculating a variance of the values of the pixels of m×n of the mean-value separated block 6, and reference numeral 24 designates the histogram counter for counting a frequency distribution of m×n pixel values of the mean-value separated block 6. Further, reference numeral 30 designates a max./min. detector for detecting a maximum value and a minimum value within the mean-value separated block signal 6 and calculating the ratio of the maximum value and the minimum value, and reference numeral 26 designates a gain mapping table for producing the gain data 27 using the variance value 23, histogram data 25, and dynamic range ratio 31.

Hereinafter, the operation of the gain analyzing portion 20 for gain analysis will be described.

The gain analyzing portion 20 of FIG. 5 analyzes the amplitude of the mean-value separated block 6, the frequency distribution of pixel values, the ratio of the maximum value and the minimum value, and determines whether the input pixel block 3 belongs to the character area or the photograph area. For the gain data analysis, the calculation of a variance $\sigma^2$ of the values of m×n pixels, which constitute the mean-value separated block 6, the counting of the histogram, and the ratio of the maximum value and the minimum value are used.

The variance calculator 22 in the gain analyzing portion 20 of FIG. 5 calculates the variance $\sigma^2$ of the values of m×n pixels, which constitute the mean-value separated block 6, i.e., the variance value, and outputs the signal 23 representative of the calculated variance value. The variance value of the m×n pixels from which the mean value is separated is defined by $$\sigma^2 = \left( \sum_{i=0}^{m-1} \sum_{j=0}^{n-1} X_{ij}^2 \right) / (m \times n) \quad (9)$$

or $$\sigma = \left( \sum_{i=0}^{m-1} \sum_{j=0}^{n-1} |X_{ij}| \right) / (m \times n) \quad (10)$$

The subsequent description will be given using the variance σ.

Figure 6A:
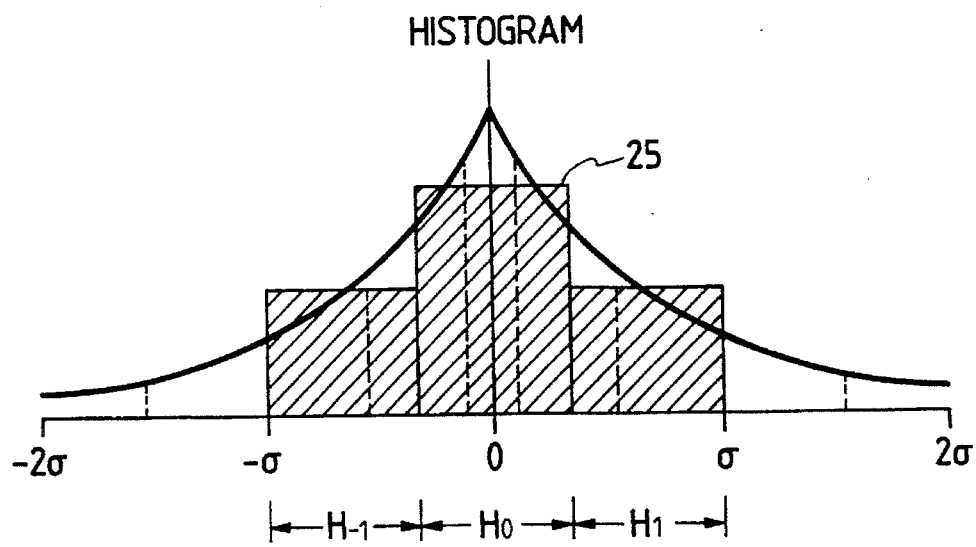
FIG. 6(a) and 6(b) are graphs for explaining the gain data analysis.
Figure 6B:
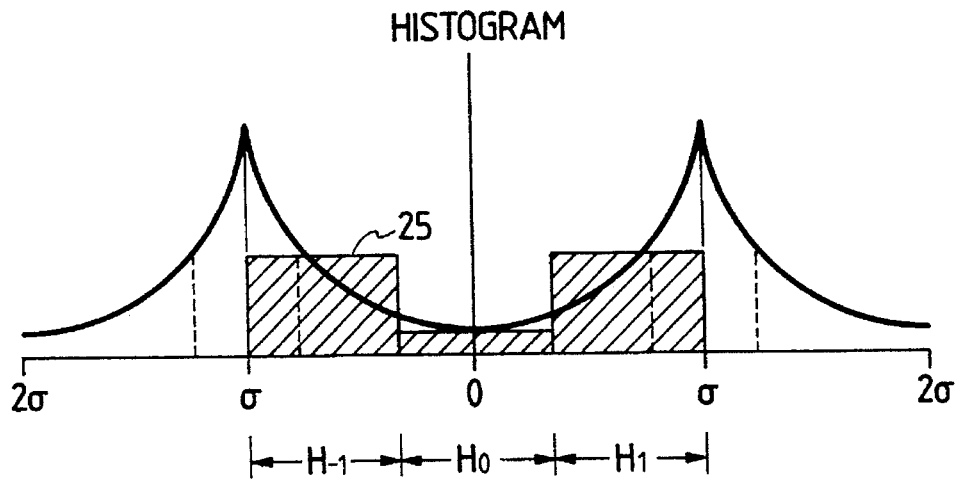

The histogram counter 24 in FIG. 5 counts frequencies of pixel values after the mean-value separated block 6 is threshold processed using the variance σ, as shown in FIGS. 6(a) and 6(b). To be more specific, the threshold value is set at ±σ/a. Three ranges are set up; a first range of less than −σ/a, a second range of a threshold value equal to or more than −σ/a to a threshold value equal to or less than σ/a, and a third range of more than σ/a. The histogram counter 24 counts frequencies of pixel values in those three ranges. Here, a is a positive real number except 0. In this embodiment, a=3. The frequencies of pixel values counted are indicated by $H_{-1}$, $H_0$, and $H_1$. The histogram counter 24 determines whether the histogram obtained is of the unimodal distribution type (FIG. 6(a)) or the bimodal distribution type (FIG. 6(b)), using the frequency values $H_{-1}$, $H_0$, and $H_1$, and produces the result of the determination in the form of the histogram data signal 25. For example, in a case where $H_{-1} \leq H_0$ and $H_0 \geq H_1$, the counter determines that the histogram is a unimodal distribution. In other cases, the counter determines that the histogram is a bimodal distribution.

Generally, the histogram is peaked at the positions corresponding to the character color and the background color when the image area is a character area. Therefore, it can be considered that the bimodal distribution indicates the character area.

The max./min. detector 30 calculates a dynamic range ratio r as a ratio of the maximum value and the minimum value, using the following equation.

$$r = \max\{x_{ij}\} / \min\{x_{ij}\} (i=1, \ldots, m, j=1, \ldots, n) \quad (11)$$

When a part of the edge, such as a character, lies on the boundary of blocks in the character area, the number of pixels of the background color is considerably different from that of the character color. Accordingly, the use of the variance and histogram sometimes leads to a misjudgment on the image area. If the dynamic range ratio r is additionally used, a large dynamic range ratio r distinctly indicates that a part of the edge, such as a character, lies on the boundary of blocks in the character area. Where the dynamic range ratio r is additionally used, there will never occur such a misjudgment that the character area is mistakenly judged as the photograph area.

The gain mapping table 26 shown in FIG. 5 is used for producing the gain data 27 as the result of discriminating the character area or the photograph area, using the variance value 23, histogram data 25, and dynamic range ratio 31.

Figure 7:
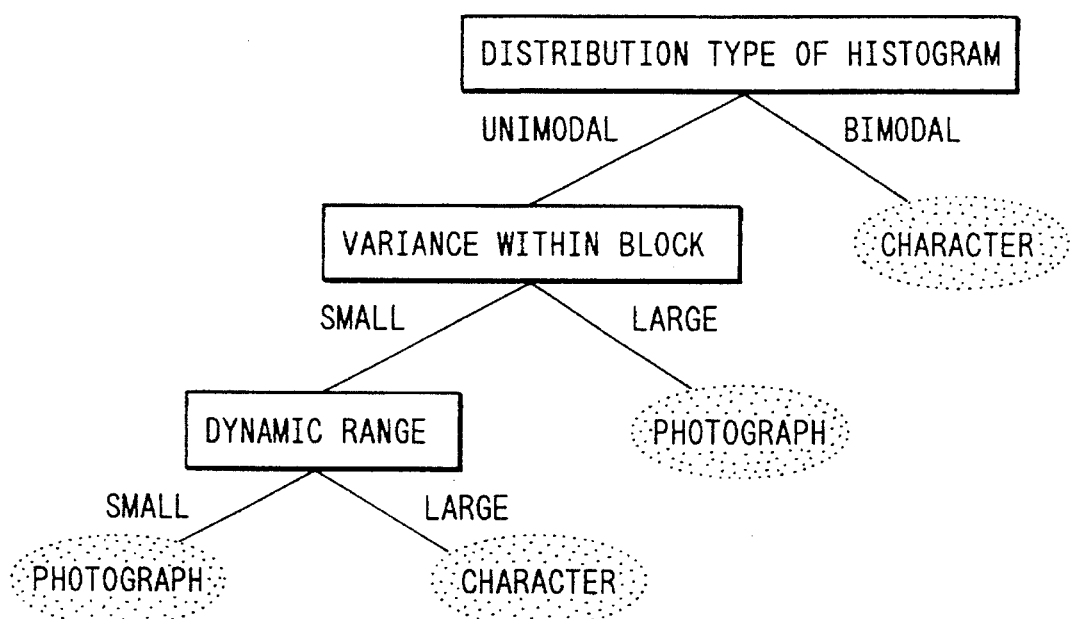
FIG. 7 is a diagram showing a tree structure for the image area determination in the gain mapping table.

FIG. 7 is a diagram showing a tree structure for the image area determination in the gain mapping table 26. At each node of the tree, control threshold processes the histogram data 25, the variance value 23, and the dynamic range ratio 31, and judges the branch. More specifically, if the histogram is of the bimodal type, control determines that the image area is a character area. If the histogram is of the unimodal type and the variance in the block is large, control determines that the image area is a photograph area. If the histogram is of the unimodal and the variance in the block is small, control checks whether the dynamic range ratio is small or large, and determines that the image area is a photograph area or a character area. The threshold at each node is set for the characteristic of the input image. In this instance of the embodiment, a single threshold is used for judging the histogram data 25, the variance value 23, and the dynamic range ratio 31. Of course, two or more thresholds may be used for the judgment. Accordingly, the tree may have three or more branches.

The gain data signal 27 produced by the gain analyzing portion 20, together with the waveform data signal 18 from the waveform analyzing portion 14, is supplied to the area discriminating portion 12 in FIG. 2, as described above.

The area discriminating portion 12 determines the area data signal 13 on the basis of the waveform data 18 and the gain data 27 as the results of the waveform analysis and the gain analysis.

The area data signal 13 consists of data for identifying the character area and the photograph area, and data indicating the direction of the tone variation in the respective image areas.

Next, the adaptive coding operation based on the area data signal 13 will be described.

In the embodiment shown in FIG. 1, the area data signal 13 thus formed is used for selecting a required quantizing matrix from among the quantizing matrices that are stored in the quantizing matrix storing section 104. The matrix selection is carried out in the quantizing matrix storing section 104.

The quantizing matrices to be stored in the quantizing matrix storing section 104 must be formed previously. This can be realized by applying the method described in "IMAGE PROCESSING HANDBOOK" already referred to, to each separated image area.

Figure 8:
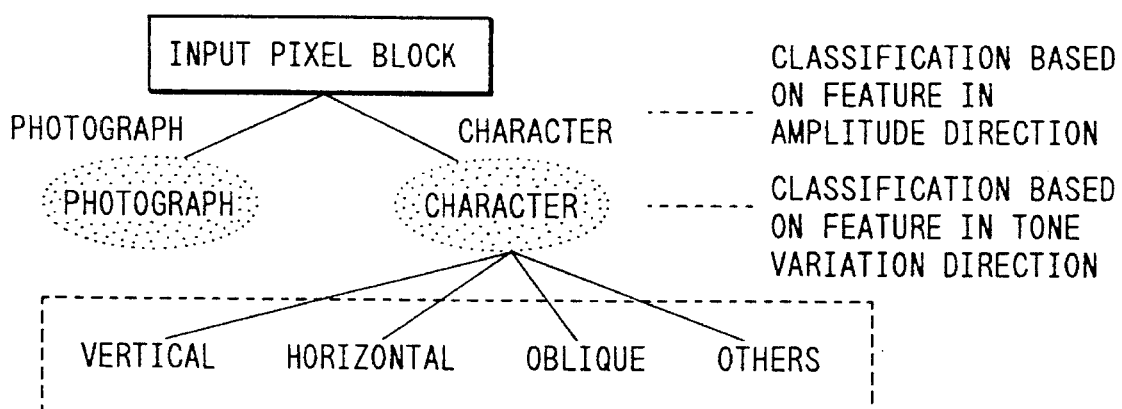
FIG. 8 is a diagram showing another tree structure for the image area determination.

FIG. 8 is a diagram showing another tree structure for the image area determination. In this tree, an actual image area is separated into a photograph area and a character area on the basis of the feature of the amplitude direction. The character area is further separated into four areas; vertical area, horizontal area, oblique area, and other areas. FIGS. 9(a) to 9(e) are diagrams showing five types of quantizing matrices designed for the photograph area and the four types of divided character areas. The quantizing matrix shown in FIG. 9(a) corresponds to the photograph area. The quantizing matrices shown in FIGS. 9(b) to 9(e) correspond respectively to the four divided character areas of which the tone varies in the vertical, horizontal, oblique, and other directions. The quantizing matrices 103 are designed so as to be equal in the total number of bits assigned to each block. The quantizing step values for the DC are also equal.

As described above, the quantizing matrices (quantizing characteristics) are previously prepared for the different areas. Accordingly, in actually coding the input image data, the quantizing characteristic can be adaptively selected in accordance with the result of the area discrimination of the input pixel block. In other words, the adaptive coding system is thus constructed.

The procedure for the variable length coding, which follows the quantizing process, is similar to that of the conventional technique, and hence no further description will be given.

The adaptive data is required when the thus coded data is decoded. For this reason, the area data signal 13 and the coded data signal 109 are multiplexed by the multiplexing section 108. In the adaptive coding system using eight types of the quantizing matrices, 3 bits are added to each block in order to identify those matrices.

In the above-mentioned embodiment, the selection of the quantizing matrices is carried out based on the results of the area analysis. Evidently, it may be carried out based on another suitable data.

Figures 12, 13:
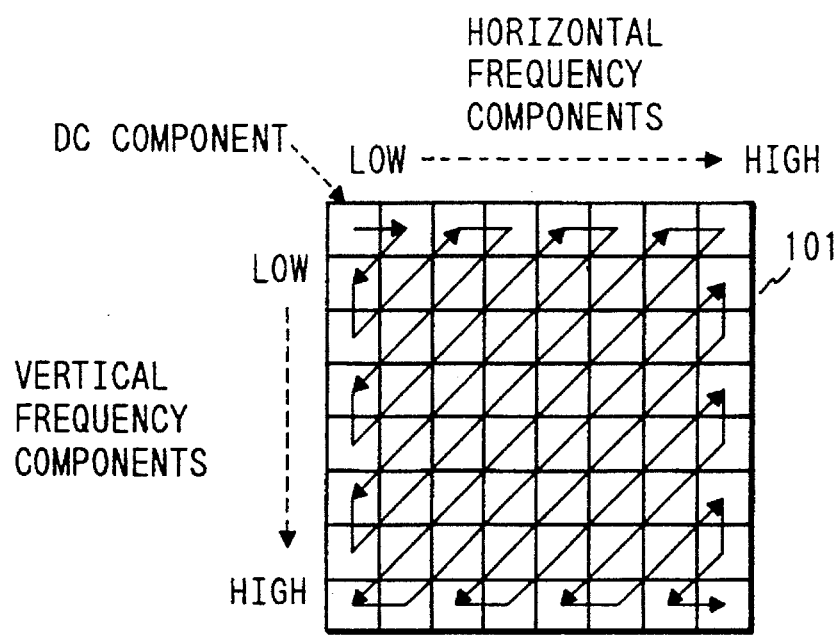
FIG. 12 is a diagram for explaining a zig-zag scan system.
FIG. 13 is a diagram showing an example of the quantizing matrix.

For example, in the conventional coding system, the matrix-arrayed transform coefficients are transformed into one-dimensionally arrayed transform coefficients in the manner of the zig-zag scan shown in FIG. 12. If required, the scan path may be set for each separated area. Particularly, in the case of the image areas separated in accordance with the direction of tone variation, the transform coefficients on which the power is concentrated are different. For such image areas, a scan path is formed so that those power concentrated coefficients are preferentially scanned. If the scan path is so formed, the coding efficiently is improved.

The code table for the variable length coding may be prepared for each separated area.

When the thus coded image signals are decoded, the scan sequences and the variable length code tables may be both selected in accordance with the area data contained in the coded data.

As seen from the foregoing description, in the present invention, the image area of the image signal to be coded is analyzed. The quantizing matrix selected in accordance with the area analysis is used for coding. Accordingly, even in a photograph image containing a character image, the quantizing characteristic suitable for the coding of the character image can be used adaptively. As a result, the image quality of the edge of the character is remarkably improved.

What is claimed is:

1. An image signal analyzing system comprising:

block extracting means for sampling an image signal and dividing the sampled image signal into input pixel blocks each comprising m×n pixels (m and n are positive integers);

mean value separating means for subtracting a mean value of the input pixel block from each pixel in the pixel block to provide a mean-value separated block;

first analyzing means for analyzing a feature quantity of a direction of tone variation of the mean-value separated block obtained from said mean value separating means;

second analyzing means for analyzing a feature quantity of a direction of amplitude based on a variance calculation and a computation of a histogram of the mean-value separated block; and judging means for judging a waveform feature of the input pixel block based on analysis by said first analyzing means and said second analyzing means, whereby said judging means determines what type of image the input pixel block belongs to.

2. The image signal analyzing system according to claim 1, wherein said first analyzing means determines a degree of proximity of the mean-value separated block and sets of representative pattern blocks of pixels previously obtained, and provides an index of the representative pattern block of the highest proximity degree that is treated as a first feature quantity of the direction of tone variation in the input pixel block.

3. The image signal analyzing system according to claim 1, wherein said first analyzing means determines a degree of proximity of sets of pattern subblocks with reference sets of pixels, said sets of pattern subblocks resulting from division of the mean value separated block by a ratio $i$ of integers ($i$ is a positive integer), and said first analyzing means obtains a set of indices for the $i$ number of subblocks, said indices corresponding to the highest proximity degree reference sets of pixels, and treats the set of indices as a first feature quantity of a direction of tone variation in the input pixel block.

4. The image signal analyzing system according to claim 3, wherein said first analyzing means further determines a proportion of subblocks that have coincident indices, and treats the proportion as a parameter indicative of a degree of complexity of a pattern of the mean-value separated block, this degree of complexity indicating a second feature quantity of tone variation.

5. The image signal analyzing system according to claim 1, wherein said second analyzing means determines whether the input pixel block represents a character image or a graphic image.

6. An image signal analyzing system comprising:

block extracting means for sampling an image signal and dividing the sampled image signal into input pixel blocks each comprising m×n pixels (m and n are positive integers);

mean value separating means for subtracting a mean value of the input pixel block from each pixel in the pixel block to provide a mean-value separated block;

first analyzing means for analyzing a feature quantity of a direction of tone variation of the mean-value separated block obtained from said mean value separating means;

second analyzing means for analyzing a feature quantity of a direction of amplitude of the mean-value separated block; and judging means for judging a waveform feature of the input pixel block based on analysis by said first analyzing means and said second analyzing means, whereby said judging means determines what type of image the input pixel block belongs to;

wherein, said second analyzing means comprises means for treating one of a mean square of the pixel values in the mean-value separated block and a mean value of the absolute pixel values as a variance of the input pixel block, means for comparing the variance with at least one threshold value, means for treating the result of the comparison as a first feature quantity of the direction of amplitude, means for obtaining an accumulative frequency distribution of the pixel values in the mean-value separated block, means for correcting a pattern of the accumulative frequency distribution in accordance with the variance, means for comparing the corrected pattern of the accumulative frequency distribution with a pattern of at least one preset normalized distribution, and means for treating an index of the distribution substantially coincident with the preset normalized distribution as a second feature quantity of the direction of amplitude.

7. The image signal analyzing system according to claim 6, wherein said second analyzing means includes means for detecting a maximum value and a minimum value within the mean-value separated block, calculates a ratio of the maximum value and the minimum value, comparing the ratio with at least one threshold value, and treating the result of the comparison as a third feature quantity of the amplitude direction.

8. An image signal coding system comprising:

block extracting means for dividing an image signal representing an image into pixel blocks each consisting of m×n pixels (m and n are positive integers);

orthogonal transforming means for orthogonally transforming the input pixel blocks to produce transform coefficients;

quantizing coefficient storing means for storing a plurality of sets of quantizing coefficients;

quantizing means for quantizing the transform coefficients using the quantizing coefficients stored in said quantizing coefficient storing means to produce quantized transform coefficients;

coding means for variable-length coding the quantized transform coefficients;

waveform area analyzing means including a first analyzing means and a second analyzing means for analyzing a the input pixel block and for producing an area data signal indicating what type of image the input pixel block belongs to, one of said plurality of sets of quantizing coefficients being selected in accordance with the waveform analysis;

multiplexor means for multiplexing results of the variable-length coding with the area data signal to produce coded data;

said waveform analyzing means further comprising mean value separating means for subtracting a mean value of the input pixel block from each pixel in the pixel block to provide a mean-value separated block and judging means for judging a waveform feature of the input pixel block based on analysis by said first analyzing means and said second analyzing means;

wherein said first analyzing means analyzes a feature quantity of the direction of tone variation of the mean-value separated block obtained from said mean value separating means, said second analyzing means analyzes a feature quantity of a direction of amplitude of the mean-value separated block.

9. The image signal coding system according to claim 8, wherein said first analyzing means determines a degree of proximity of the mean-value separated block and sets of representative pattern blocks of pixels previously obtained, and provides an index of the representative pattern block of a highest proximity degree that is treated as a first feature quantity of a direction of tone variation in the input pixel block.

10. The image signal coding system according to claim 8, wherein said second analyzing means comprises means for treating one of a mean square of the pixel values in the mean-value separated block and a mean value of the absolute pixel values as a variance of the input pixel block, means for comparing the variance with at least one threshold value, means for treating the result of the comparison as a first feature quantity of the direction of amplitude, means for obtaining an accumulative frequency distribution of the pixel values in the mean-value separated block, means for correcting a pattern of the accumulative frequency distribution in accordance with the variance, means for comparing the corrected pattern of the accumulative frequency distribution with a pattern of at least one preset normalized distribution, and means for treating the index of the distribution coincident with the preset normalized distribution as a second feature quantity of the direction of amplitude, and means for treating the index of the distribution closest to the preset normalized distribution as a second feature quantity of the direction of amplitude when the index of the distribution is not coincident with the preset normalized distribution.

11. The image signal coding system according to claim 10, wherein said second analyzing means includes means for detecting a maximum value and a minimum value within the mean-value separated block, calculates a ratio of the maximum value and the minimum value, comparing the ratio with at least one threshold value, and treating the result of the comparison as a third feature quantity of the amplitude direction.

12. The image signal coding system according to claim 8, wherein said first analyzing means determines similarity between reference sets of pixels representing tone variation patterns and sets of pattern subblocks resulting from division of the mean-value separated block by a ratio $i$ of integers ($i$ is a positive integer), obtains a set of indices for the $i$ number of subblocks corresponding to the sets of reference pixels that are most similar to the pattern subblocks, and treats the set of indices as a first feature quantity of the direction of tone variation in the input pixel block.

13. The image signal analyzing system according to claim 12, wherein said first analyzing means further determines a proportion of subblocks that have coincident indices, treats the proportion as a parameter indicative of a degree of complexity of a pattern of the mean-value separated block, this degree of complexity indicating a second feature quantity of tone variation.

* * * * *

UNITED STATES PATENT AND TRADEMARK OFFICE
CERTIFICATE OF CORRECTION

PATENT NO. : 5,613,015
DATED : March 18, 1997
INVENTOR(S) : Kazuhiro SUZUKI et al.

It is certified that error appears in the above-indentified patent and that said Letters Patent is hereby corrected as shown below:

Claim 8, column 12, line 36, before "the input", delete "a".

Signed and Sealed this

Twenty-first Day of October 1997

Attest:

BRUCE LEHMAN

*Attesting Officer*  *Commissioner of Patents and Trademarks*